(12) United States Patent
Cuylen

(10) Patent No.: US 6,356,584 B1
(45) Date of Patent: Mar. 12, 2002

(54) METHOD FOR THE CLOCKED SERIAL DATA TRANSMISSION OF DATA BLOCKS OF IDENTICAL BLOCK LENGTH

(75) Inventor: Michael Cuylen, Zirndorf (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/272,319

(22) Filed: Mar. 19, 1999

Related U.S. Application Data

(63) Continuation of application No. PCT/DE97/01991, filed on Sep. 8, 1997.

(30) Foreign Application Priority Data

Sep. 19, 1996 (DE) .......................... 196 38 424

(51) Int. Cl.$^7$ .............................. H04B 1/38; H04L 1/14
(52) U.S. Cl. ..................... 375/221; 375/219; 714/750
(58) Field of Search ................................. 375/221, 219, 375/222, 373, 354, 360, 224, 228; 379/97, 96; 455/522, 69; 714/750, 751

(56) References Cited

U.S. PATENT DOCUMENTS 5,142,538 A    8/1992  Fickes et al. .............. 714/750
5,265,151 A  * 11/1993  Goldstein ................. 379/93.32
6,163,570 A  * 12/2000  Olafsson ................... 375/223

FOREIGN PATENT DOCUMENTS

| EP | 0452124 A2 | 10/1991 |
|----|------------|---------|
| EP | 0457704 A1 | 11/1991 |
| JP | 64-834     | 1/1989  |
| WO | 91/16697   | 10/1991 |

* cited by examiner

Primary Examiner—Chi Pham
Assistant Examiner—Khai Tran
(74) Attorney, Agent, or Firm—Sughrue Mion, PLLC

(57) ABSTRACT

The method is used for data transmission between a first (U1) and a second transmission device (U2) via a transmission link (K). Transmitted data blocks (Bx') are returned for checking purposes and, if appropriate, sent repeatedly. Fast and error-free data transmission can thus be effected even when there is interference (X) on the transmission link (K). The method is particularly for transmission links (K) which cannot be shielded against interfering influences or can be shielded only to a limited extent by means of EMC measures.

4 Claims, 3 Drawing Sheets

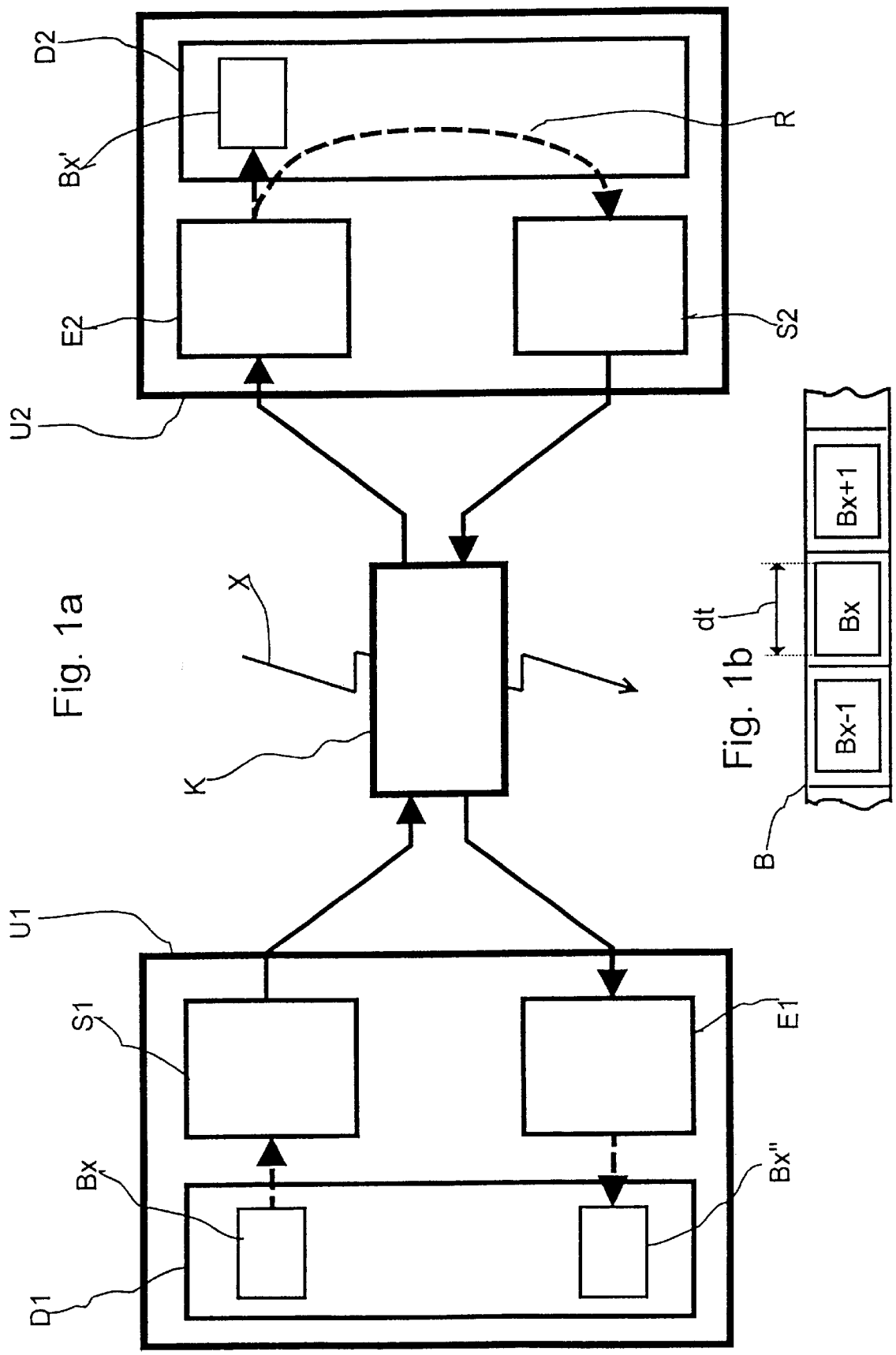

METHOD FOR THE CLOCKED SERIAL DATA TRANSMISSION OF DATA BLOCKS OF IDENTICAL BLOCK LENGTH

This is a Continuation of International Application PCT/DE97/01991, with an international filing date of Sep. 8, 1997, the disclosure of which is incorporated into this application by reference.

FIELD OF AND BACKGROUND OF THE INVENTION

The invention relates to new and useful improvements in data transmission. More particularly, the invention relates to a method for the clocked serial data transmission of data blocks of identical block length.

A data transmission system ought to enable data to be transmitted as fast as possible and as free from errors as possible. The data are usually transmitted with a predetermined transmission speed, the "baud rate", at which data blocks of identical block length are transmitted bit by bit and serially from a sending device to a receiving device.

In the context of digital data transmission, in particular, a data block usually has bit sequences for a header, as well as useful data and a conclusion criterion. The header usually contains details concerning the block length, while the conclusion criterion has a bit sequence which is defined in a transmission protocol. Since the data block has a defined length, control criteria are accommodated in particular in the bit sequence which is reserved for the useful data of a data block. The control criteria are used in the receiving device in particular to check correct transmission. These criteria include, by way of example, a check bit, a so-called "parity bit". If the length of the bit sequence reserved for the useful data of a data block is e.g. eight bits, thus forming a byte, then specific bit combinations are reserved for special declarations and are not available for the actual transmission of the useful data. Consequently, the entire range of bit combinations from 0 to 255, or from 00 to FF, cannot be transmitted in a data block.

Therefore, efforts are generally made to transmit data with long data blocks. The purpose is to attain a faster transmission speed than with data transmission using short data blocks.

One disadvantage is that long data blocks have a correspondingly higher probability of experiencing interference during transmission and of being transmitted with errors. The entire data block must then be resent. Furthermore, particularly when there is periodic interference on the transmission link between the sending and receiving devices, error-free transmission may prove to be impossible if the clock frequency of interference pulses is above the clock frequency for the transmission of a data block. A transmission link subjected to such interference must then be provided with interference suppression by means of electromagnetic shielding measures.

U.S. Pat. No. 5,142,538 discloses a transmission method in which a data block is transmitted by a sender to a receiver and returned by the receiver to the sender. The data block sent originally and the data block received again are compared in the sender, to check that the data have been transmitted correctly. If the received data block does not correspond to the sent data block, then the data block is retransmitted. The transmission method is based on monodirectional data transmission with a so-called SIMPLEX-like mode in which the data are transmitted either from the sender to the receiver or from the receiver to the sender.

Publication WO 91/16697 discloses a transmission protocol for a data transmission device between a sender and a receiver. In this case, each data bit transmitted by the sender to the receiver is transmitted back from the receiver to the sender. If the data bits transmitted back do not correspond to the data bits sent originally, a control character is communicated to the receiver. This alerts the receiver to the fact that the faulty data will be retransmitted.

OBJECTS OF THE INVENTION

It is therefore an object of the invention to provide a method for data transmission which is faster and less sensitive to interference than conventional methods.

SUMMARY OF THE INVENTION

This and other objects are achieved by a method for clocked serial data transmission of data blocks of identical block length between a first and a second transmission device. According to one formulation of the invention, the method includes:

a) sending a data block as a sent data block in a first block cycle from the first to the second transmission device, b) receiving the data block as a received data block at the second transmission device, and returning the received data block as a returned data block to the first transmission device, c) receiving the returned data block at the first transmission device, comparing the returned data block with the sent data block, and generating a comparison result during a second clock cycle, d) in a third clock cycle,
  d1) in case of a comparison result signaling correspondence, continuing the data transmission from the first to the second transmission device by sending a further data block, or
  d2) in case of a comparison result signaling non-correspondence, suspending the data transmission from the first to the second transmission device for the third clock cycle, and e) in the second transmission device,
  e1) in case of a detection of a single clock cycle with suspended data transmission, overwriting the received data block received in the first clock cycle with a next subsequent received data block following the suspended data transmission, or
  e2) in case of a detection of two successive clock cycles with suspended data transmission, overwriting the received data block and a data block received immediately following the received data block with the next subsequent received data block following the suspended data transmission and another data block received immediately following the next subsequent received data block, respectively.

An advantage of the method of the invention is that fast and virtually error-free data transmission can take place even when there is interference on the transmission link. This is advantageous particularly in the case of transmission links which cannot be shielded against interfering influences or can be shielded only to a limited extent by means of EMC measures. Examples of such poorly shieldable transmission links are infrared transmission links or copper transmission links that cannot be shielded. In optical transmissions, the interference may occur, by way of example, due to a fluorescent lamp being switched on and/or flickering. In the context of shipbuilding, by way of example, power currentcarrying lines are frequently laid, unavoidably, in the vicinity of signal or control lines. The high currents in the power current lines may then interfere with the data transmission on the signal or control lines.

A further advantage of the method of the invention is that the useful data contained in data blocks need no longer have bit combinations with special declarations for transmission error detection. This free configuration of the content of all the useful data bits contained in data blocks is advantageously possible because specific control information items which report or interrupt or stop a data flow subjected to interference need not be transmitted.

A further advantage of the method of the invention is that intermission times are reduced to a minimum between two successively transmitted data blocks. A data block received with errors can be corrected immediately.

The data transmission for the method according to the invention can take place in a mode similar to the so-called DUPLEX mode. Sending and receiving operations between a first and a second transmission device can take place simultaneously in both transmission directions. As a result, in the method of the invention, the return reception of data blocks for checking purposes is possible at the same time as the sending of data blocks. The preferably relatively short data blocks enable each individual data block to have an advantageously short transmission duration. The transmission can thus take place with a high clock frequency. If a data block is subjected to interference during transmission, then only this short data block need be transmitted again. Particularly fast correction can thus be effected. Consequently, the method according to the invention enables data transmission even when there is periodic interference on the transmission link between the sending and receiving devices.

A further advantage is that electronic components necessary for sequence control for implementing the method of the invention can be realized in particular with an integrated circuit, for example an ASIC.

BRIEF DESCRIPTION OF THE DRAWINGS

The invention and further advantageous refinements of the invention are explained in more detail below with the aid of diagrammatic, exemplary embodiments in the drawing, in which:

FIG. 1a shows, by way of example, transmission of data blocks from a first to a second transmission device via a transmission link, FIG. 1b shows, by way of example, a sequence of data blocks to be transmitted.

DETAILED DESCRIPTION OF THE PREFERRED EMBODIMENTS

FIG. 1a illustrates a transmission link K between a first transmission device U1 and a second transmission device U2. The first transmission device U1 has a first data processing system D1 as well as a first sending device S1 and a first receiving device E1. Analogously to the first transmission device U1, the second transmission device U2 has a second data processing system D2 as well as a second sending device S2 and a second receiving device E2.

According to the invention, a data block BX to be transmitted is sent via the first sending device S1 and is received, via the transmission link K, by the second receiving device E2 of the second transmission device U2. The data block Bx' received there is stored in the second data processing system D2, returned by means of the second sending device S2 to the first transmission device U1 and received in the latter as data block Bx" by means of the first receiving device E1. The process of returning the received data block Bx', the so-called "reflection" or "echo", is illustrated by way of example by the arrow R in FIG. 1a. The first data processing system D1 compares the returned data block Bx" with the data block Bx originally sent by the data processing system D1, i.e., with the "original". The first data processing system D1 of the first transmission device U1 can thus ascertain whether the data block Bx has been transmitted correctly. Data may by transmitted with errors in particular as a result of electromagnetic interference X on the transmission link K. If the result of the comparison between the sent data block Bx and the data block Bx" returned for checking purposes turns out to be a non-correspondence, then the data block Bx should be retransmitted in accordance with the invention.

A detail from a sequence of data blocks Bx−1, Bx and Bx+1 of a volume B of data to be transmitted is illustrated by way of example in FIG. 1b. Digital data blocks Bx−1, Bx and Bx+1 are generally involved here. By way of example, the volume B of data is subdivided into relatively short data blocks Bx−1, Bx and Bx+1 of identical block length dt by means of the first data processing system D1 illustrated in FIG. 1a. If appropriate, the data blocks Bx−1, Bx and Bx+1 prepared for transmission in this way may each have a header and a conclusion criterion.

Figure 2A:
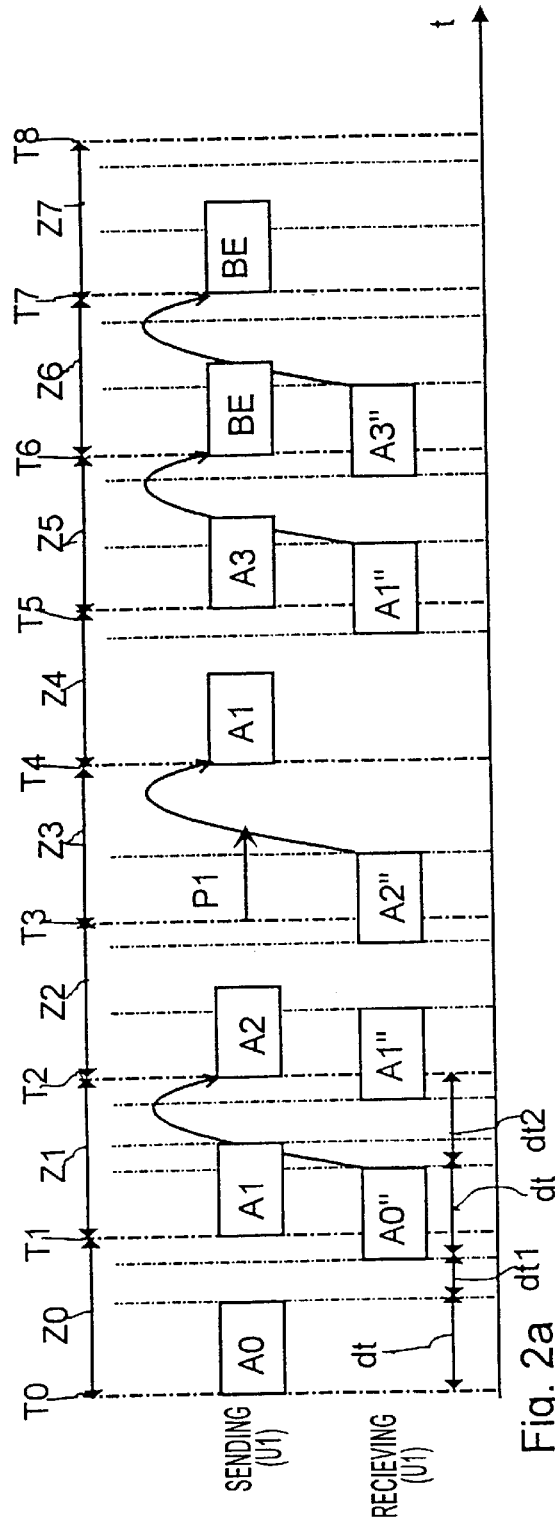
FIG. 2a shows a diagram showing a sequential pattern of events of a first example of data transmission according to the invention, which is effected simultaneously in both transmission directions and in the course of which a data block is subjected to interference.
Figure 2B:
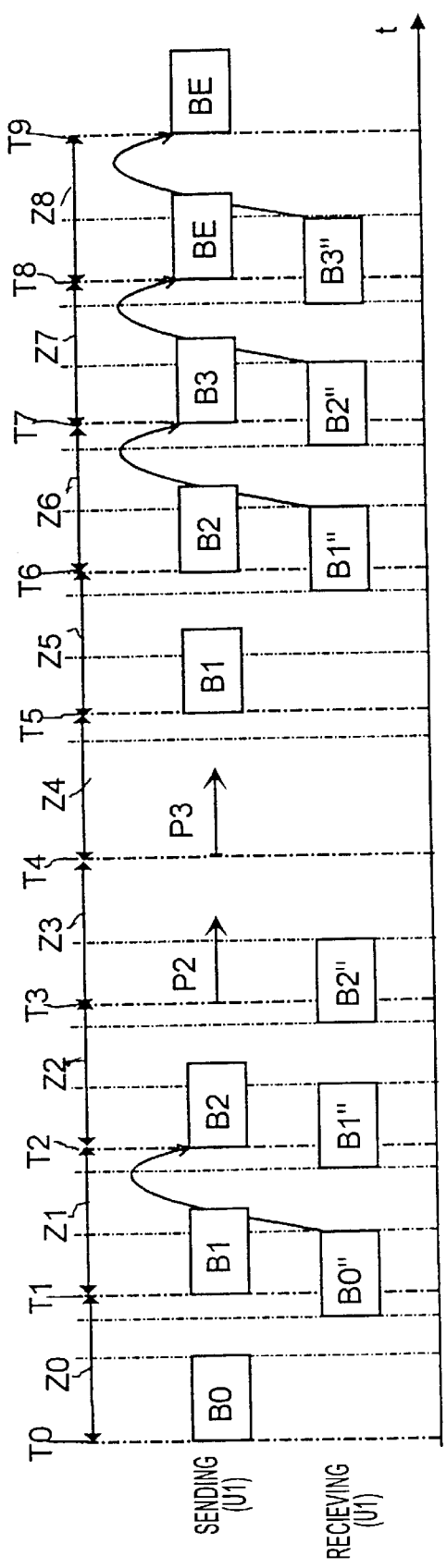
FIG. 2b shows a diagram showing a sequential pattern of events of a second example of the data transmission according to the invention, wherein two successive data blocks are subjected to interference.

FIGS. 2a and 2b illustrate the diagrams showing sequential patterns of events of a first and second example of data transmission by the inventive method for the clocked serial transmission of data blocks A0, A1, A2, A3 and B0, B1, B2, B3, respectively. The data transmission in the examples of FIGS. 2a and 2b takes place in a mode in which sending and/or receiving operations can be effected simultaneously in two directions. In the examples illustrated in FIGS. 2a and 2b, one data block A1 is transmitted with errors and two data blocks B1 and B2 are transmitted with errors, respectively. The diagrams showing sequential patterns of events illustrated in FIGS. 2a and 2b each represent only an extract from exemplary data transmission by the method of the invention. The ascending numbering of the data blocks A0 to A3 and B0 to B3 which are transmitted serially one after the other serves, in particular, only to identify an extract of data blocks from data transmission which can be considerably longer. Data are transmitted, in particular, via a transmission link K, corresponding to that illustrated in FIG. 1a, between a first transmission device U1 and a second transmission device U2.

The abscissa of the diagrams showing sequential patterns of events in FIGS. 2a and 2b is a time axis t. Clock cycles Z0 to Z8 are also shown. They are present between instants T0 to T9. By way of example, the clock cycle present between the instants T0 and T1 is designated by Z0. Sending and receiving operations of the data transmission sequences illustrated by way of example are represented in the upper and lower lines, respectively, of the diagrams showing sequential patterns of events in FIGS. 2a and 2b. These operations relate, with respect to the instants T0 to T9, to the first transmission device U1 illustrated in FIG. 1a.

In the illustration in FIG. 2a, by way of example, at the instant T0 a data block A0 having the block length dt is sent in a clock cycle Z0 from the first transmission device U1 to the second transmission device U2. The data block received by the latter is, in particular, buffer-stored and returned to the first transmission device U1. After a period dt1, a data block A0", comparable with an "echo" of the data block A0 and having the block length dt arrives back at the first transmission device U1. The period dt1 corresponds, in particular, to the reaction time of the second transmission device U2 plus the time delay due to the transmission link K. As mentioned, the returned data block A0" is received in the first transmission device U1 and compared with the data block A0 originally sent by the first transmission device U1 during the period dt2. The period dt2 is allowed to last at most until the subsequent clock cycle Z1 has expired. Within this period a comparison result is generated during the clock cycle Z1. If the comparison result signals correspondence, the data transmission is continued at the instant T2 by a further data block A2 being sent in the succeeding clock cycle Z2.

The method of the invention makes it possible, for example while the data block A0" is being received in the first transmission device U1, simultaneously for a further data block A1 to be sent to the second transmission device U2 at the instant T1 in the clock cycle Z1. The "echo" of the data block A1, i.e., the data block A1", is thereupon received by the first transmission device U1 and compared with the data block A1. The comparison result with regard to correspondence or non-correspondence is generated during a second clock cycle Z2. In the example of FIG. 2a, the data block A1 has been transmitted with errors. On the basis of the comparison result which consequently signals non-correspondence, the data transmission from the first transmission device U1 to the second transmission device U2 is thus suspended for a third clock cycle Z3. The suspension of the sending operation of the first transmission device U1 in the third clock cycle Z3 is represented by way of example by the arrow P1 in FIG. 2a. The first transmission device U1 can, in the meantime, advantageously receive a data block returned by the second transmission device U2. This is illustrated by the data block A2" in FIG. 2a.

The suspension of the sending operation of the first transmission device U1 during the clock cycle Z3 alerts the second transmission device U2 to the fact that the data block A1 has been transmitted with errors and that, consequently, this data block must be retransmitted.

According to the method of the invention, when clock cycles with suspended data transmission are detected, the second transmission device U2 overwrites data blocks received in preceding clock cycles with data blocks received in succeeding clock cycles.

In the example of FIG. 2a, the second transmission device U2 detects a single clock cycle Z3 with suspended data transmission from the first transmission device U1 to the second transmission device U2. Consequently, the data block A1 transmitted with errors in the penultimate clock cycle Z1 is overwritten by the data block A1 transmitted in the subsequent clock cycle Z4 in the second transmission device U2. In the example of FIG. 2a, the data block A1 transmitted with errors in the clock cycle Z1 is retransmitted in the clock cycle Z4, after the suspension represented by the arrow P1, and checked for error-free transmission by the method of the invention until the subsequent clock cycle Z5 has expired. Furthermore, in the same clock cycle Z5 the data transmission can simultaneously be continued by a subsequent data block A3 being sent from the first transmission device U1 to the second transmission device U2.

FIG. 2b illustrates a second example of a diagram showing a sequential pattern of events of data transmission according to the invention. Two successive data blocks B1 and B2 are transmitted with errors in the example of FIG. 2b. These data blocks are sent by the first transmission device U1 during the clock cycles Z1 and Z2. Such a sequence of two successive data blocks transmitted with errors can take place particularly in the mode comparable with the DUPLEX mode. According to the method of the invention, the data transmission from the first transmission device U1 to the second transmission device U2 is suspended, in a manner represented by the arrows P2 and P3, in the respectively succeeding clock cycles Z3 and Z4.

The suspension of the sending operation of the first transmission device U1 during the clock cycles Z3 and Z4 alerts the second transmission device U2 to the fact that the data blocks B1 and B2 have been transmitted with errors, and that, consequently, these data blocks must be retransmitted.

Therefore, if the second transmission device U2 detects two successive clock cycles Z3 and Z4 with suspended data transmission from the first transmission device U1 to the second transmission device U2, then the data blocks B1 and B2 transmitted with errors in the two preceding clock cycles Z1 and Z2 are overwritten by data blocks B1 and B2 transmitted in the two succeeding clock cycles Z5 and Z6, preferably in the same order. In the succeeding clock cycle Z7, the data transmission can be continued by a subsequent data block B3 being sent from the first transmission device U1 to the second transmission device U2.

Preferably, an abortion criterion (illustrated in the examples in FIGS. 2a and 2b) may be agreed between the first transmission device U1 and the second transmission device U2. This criterion can take the form of two data blocks BE sent one after the other. Such data blocks BE can be used by the second transmission device U2 to identify the end of a data transmission and need not necessarily be returned to the first transmission device U1.

Figure 3:
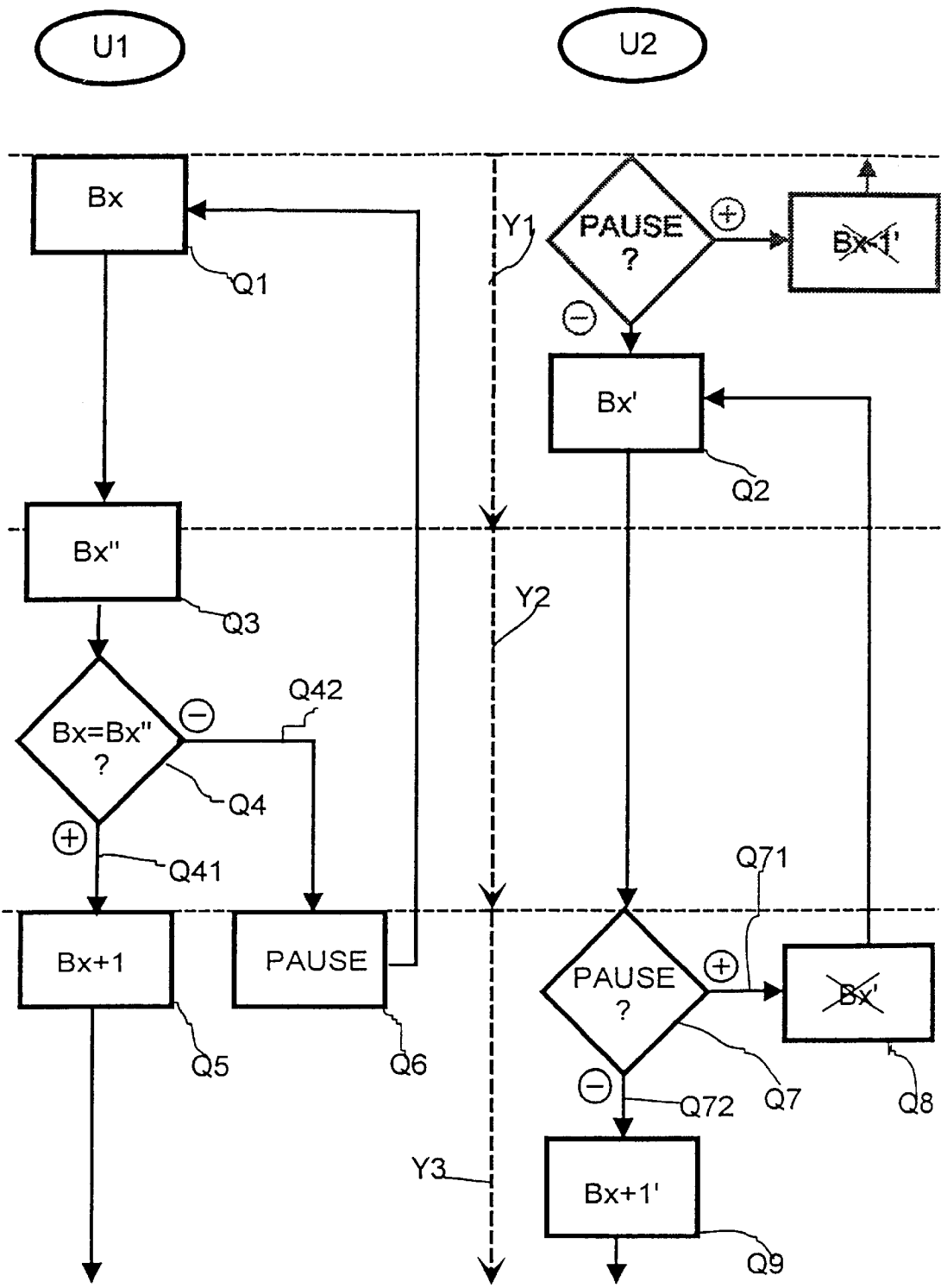
FIG. 3 shows, by way of example, a flow chart illustrating the sequence of an embodiment of the method for the first transmission device, whereby the data transmission is not effected simultaneously in both transmission directions.

Flow charts relating to the sequence of the method in the mode comparable with the SIMPLEX mode are illustrated by way of example in FIG. 3. Whereas the left side of FIG. 3 illustrates the sequence of the method with regard to the first transmission device U1, the right side of FIG. 3 illustrates the corresponding sequence with regard to the second transmission device U2.

In FIG. 3, a data block Bx is sent from the first transmission device U1 to the second transmission device U2 in a clock cycle Y1. This is represented by the block Q1, by way of example. Furthermore, as is represented by the blocks Q2 and Q3, the data block Bx' received by the second transmission device U2 is returned to the first transmission device U1. The returned data block Bx" is compared with the data block Bx in the first transmission device U1. A comparison result is generated during a second clock cycle Y2. This is represented in the left side of FIG. 3, by way of example, by the rhombus Q4 with the decision branches Q41 and Q42.

A comparison result which signals correspondence is represented by the decision branch Q41 in FIG. 3. If this result is present, then the data transmission is continued in the subsequent, third clock cycle Y3 by a further data block Bx+1 being sent. This is represented, by way of example, by the block Q5 in FIG. 3 and by the decision branch Q72 of the rhombus Q7, as well as the block Q9, in the right side of FIG. 3.

On the other hand, a comparison result which signals non-correspondence is represented by the decision branch Q42 in FIG. 3. If this result is present, then the data transmission is suspended for the subsequent, third clock cycle Y3. This is represented by way of example by the block Q6 in the left side of FIG. 3. If the second transmission device U2 detects a clock cycle Y3 with suspended data transmission, then the data block Bx' received in the penultimate clock cycle Y1 is overwritten by the data block Bx' received in the succeeding clock cycle. This is represented in the right side of FIG. 3, by way of example, by the decision branch Q71 of the rhombus Q7 and the blocks Q8 and Q2.

An advantage of the inventive method for data transmission is that fast and error-free data transmission can take place even when there is interference on the transmission link. This is advantageous particularly in the case of transmission links which cannot be shielded against interfering influences or can be shielded only to a limited extent by means of EMC measures. The inventive return of the transmitted data blocks for checking purposes means that useful data contained in these data blocks need not have any bit combinations with special declarations for transmission error detection.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A method for clocked serial data transmission of data blocks of identical block length between a first and a second transmission device, comprising:
   a) sending a data block as a sent data block in a first block cycle from the first to the second transmission device,
   b) receiving the data block as a received data block at the second transmission device, and returning the received data block as a returned data block to the first transmission device,
   c) receiving the returned data block at the first transmission device, comparing the returned data block with the sent data block, and generating a comparison result during a second clock cycle,
   d) in a third clock cycle,
      d1) in case of a comparison result signaling correspondence, continuing the data transmission from the first to the second transmission device by sending a further data block, or
      d2) in case of a comparison result signaling non-correspondence, suspending the data transmission from the first to the second transmission device for the third clock cycle, and
   e) in the second transmission device,
      e1) in case of a detection of a single clock cycle with suspended data transmission, overwriting the received data block received in the first clock cycle with a next subsequent received data block following the suspended data transmission, or
      e2) in case of a detection of two successive clock cycles with suspended data transmission, overwriting the received data block and a data block received immediately following the received data block with the next subsequent received data block following the suspended data transmission and another data block received immediately following the next subsequent received data block, respectively.

2. A method for clocked serial data transmission of data blocks of identical block length between a first and a second transmission device, comprising:
   a) sending a first data block as a first sent data block from the first to the second transmission device;
   b) receiving the first sent data block as a first received data block at the second transmission device;
   c) returning the first received data block as a first returned data block to the first transmission device;
   d) comparing the first returned data block with the first sent data block;
   e) suspending data transmission from the first to the second transmission device for at least one clock cycle if said comparing step indicates non-correspondence between the first returned data block and the first sent data block;
   f) subsequent to said suspending step, re-sending the first data block as a second sent data block from the first to the second transmission device;
   g) receiving the second sent data block as a second received data block at the second transmission device; and
   h) overwriting the first received data block with the second received data block.

3. The method according to claim 2, further comprising:
   a1) sending a third data block from the first to the second transmission device between said steps a) and f).

4. The method according to claim 3, further comprising:
   b1) receiving the third data block as a third received data block at the second transmission device;
   c1) returning the third received data block as a further returned data block to the first transmission device;
   d1) comparing the further returned data block with the third data block;
   e1) suspending data transmission from the first to the second transmission device for at least another clock cycle adjacent to the one clock cycle if said step d1) indicates non-correspondence between the further returned data block and the third data block;
   f1) subsequent to said step e1), re-sending the third data block as a fourth sent data block from the first to the second transmission device;
   g1) receiving the fourth sent data block as a fourth received data block at the second transmission device; and
   h1) overwriting the third received data block with the fourth received data block.

* * * * *